INVENTORS
GEORGE R. BIRD
MAXFIELD PARRISH, JR.
BY
BROWN and MIKULKA
ATTORNEYS

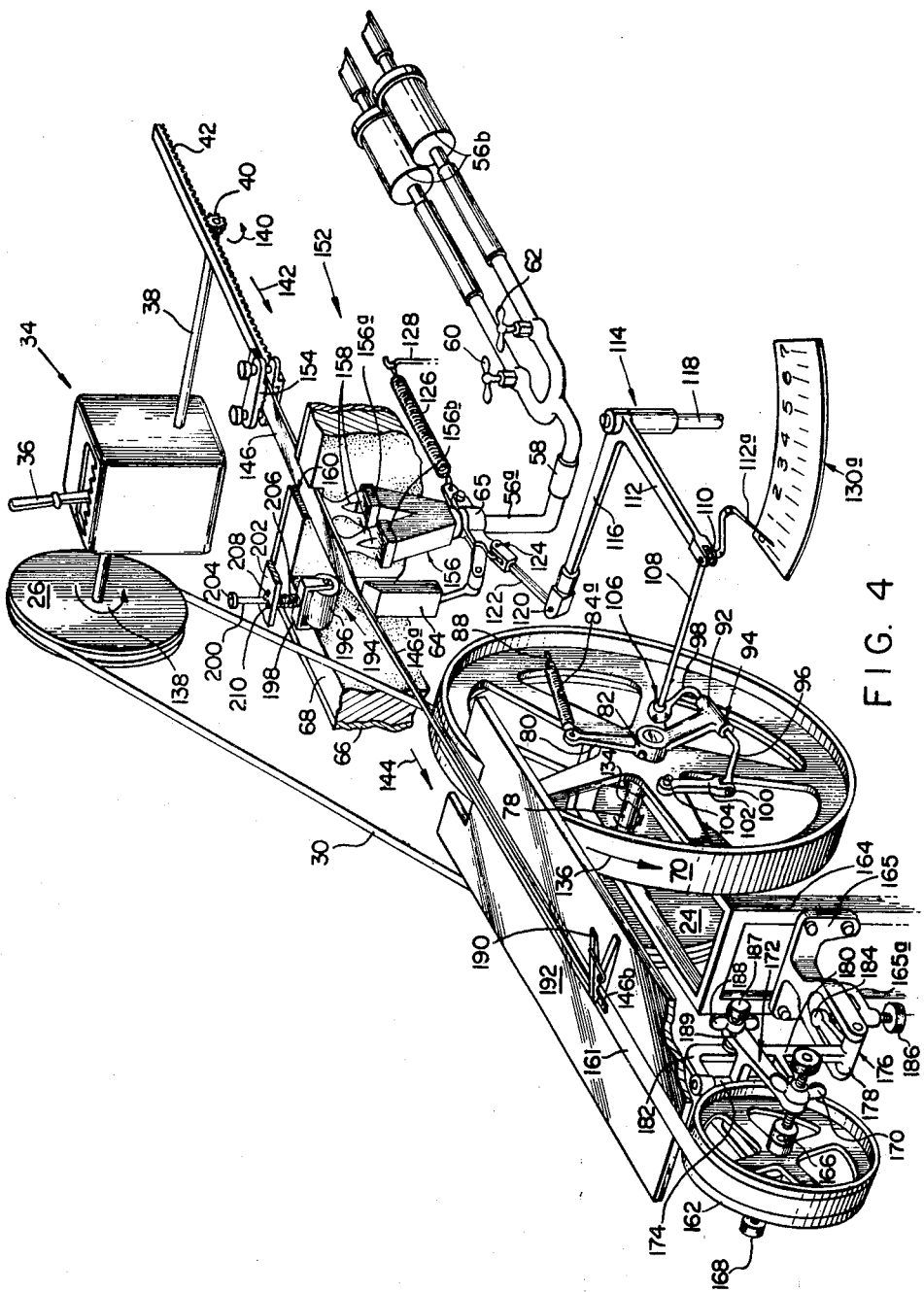

United States Patent Office 3,498,771
Patented Mar. 3, 1970

3,498,771
APPARATUS FOR DRAWING FINE FILAMENTS WITH TENSION SENSING MEANS
George R. Bird, Concord, and Maxfield Parrish, Jr., Lexington, Mass., assignors to Polaroid Corporation, Cambridge, Mass., a corporation of Delaware
Original application Mar. 9, 1964, Ser. No. 350,266. Divided and this application Feb. 12, 1968, Ser. No. 722,508
Int. Cl. C03b 25/04
U.S. Cl. 65—12      3 Claims

ABSTRACT OF THE DISCLOSURE

The present application discloses an apparatus for producing a light polarizer of acceptable optical properties in the form of a multiplicity of microscopic metallic filaments embedded in glass. The apparatus, in brief, comprises a drive motor with a variable speed control, means for supplying and advancing one or more glass elements containing, or having introduced thereinto, a metal having a lower melting point then the softening point of the glass and adapted to be converted into the form of the aforesaid filaments, together with means for heating the combination of glass and metal and predeterminedly varying temperatures, a servo or follow-up mechanism for insuring uniformity of cross section of the filaments and various associated components.

---

This application is a division of the copending application Ser. No. 350,266 filed Mar. 9, 1964.

This invention relates to an improved light polarizer; to elements usable in the production thereof; and to methods and apparatus for effecting their production. More particularly, the invention relates to a novel metal-in-glass type of light-polarizing element which is relatively highly-resistant to heat and abrasion and adapted to the polarization of radiation in the visible as well as other desired regions of the optical spectrum.

The product of the present invention is intended to fulfill the basic need for a light polarizer of at least satisfactory optical qualities which possesses the advantages of high stability, an inherent resistant to abrasion without the necessity of lamination between protective surfaces, and an ability to withstand much higher temperatures than conventional plastic light-polarizing materials comprising dichroic substances. In addition to these physical characteristics, the light polarizer of the invention possesses certain desirable optical properties such as those of a high maximum transmittance, a minimum of color at full transmission or extinction, and minor and major densities providing an effective density ratio $(d_2/d_1)$, the terms "density ratio" and "dichroic ratio" being used interchangeably herein.

The phenomenon of polarizing an unpolarized beam by passing it through a metallic grating or wire grid, where the spacing between the metallic elements is less than the wavelength of the incident beam, has been known for a considerable period. Heinrich Hertz, using a grating composed of wires of .040 inch diameter spaced 3 cm. apart, demonstrated the phenomenon in 1888 with respect to radio waves (MacMillan and Company, Ltd., London, 1893). DuBois and Rubens (Annalin der Physik, 1911, vol. 35, page 243) measured the polarization of macroscopic wire gratings, composed of wires of .00096 diameter, at wavelengths in the far-infrared to 24 microns. C. W. Peters and W. K. Pursley (Journal of the Optical Society of America, vol. 42, p. 877(A), 1954) have conducted a study of wire gratings as polarizers, using 3 cm. microwave and far-infrared measurements, with special reference to the ratio of the grating spacing to wavelength, the ratio of the opaque to clear widths, the polarizing orientation, etc. A disclosure of a wire-grid form of light polarizer, involving the stretching of fine metallic wires in its manufacture and said to be operative in the visible range, is contained in the patents of C. H. Brown (U.S. Patents 2,224,214 and 2,287,598), wherein stretching a solid wire surrounded by a softened glass to produce a wire diameter of .2 micron and a spacing between wires of .5 micron are proposed. However, it has been found to be practically impossible to adapt any of the foregoing techniques to the production of light polarizers capable of the spectral ranges and density ratios contemplated herein. For example, it has been ascertained that solid metallic wires cannot be drawn to the minimum diameters suggested. Neither can they be produced as continuous filaments in the manner described with any degree of certainty or consistency such as would be required in a "production" operation, nor can a grid of the fineness required of polarizers of the present invention be achieved by the aforesaid methods requiring the manipulation of individual elements because of the extreme fragility of the wires which must be employed. Furthermore, certain of the metals heretofore suggested in making wire gratings are not suitable for use throughout the spectral ranges contemplated by the present invention because of some deficiency from an absorption or reflection viewpoint.

Another type of light polarizer, operative in the infrared and visible regions of the spectrum, has been described in an abstract of G. R. Bird and M. Parrish, Jr. (Journal of the Optical Society of America, vol. 50, No. 9, pp. 886–891, September 1960). This polarizer involves a selective deposition-in-vacuum of a metal on a grating similar to a transmission type of diffraction grating. While structurally unlike any polarizer of the present invention, it does permit the employment of extremely fine metallic elements with a spacing therebetween of .45 micron or less.

Thus, in resume, it appears that although the metallic grid has been considered with respect to its ability to polarize various forms of radiation, previously-mentioned polarizers of this type have largely been unadapted to polarize effectively in the visible regions of the optical spectrum or they have been practically impossible to manufacture. In any case, they have been of an entirely different structural category and have been produced by methods which differ widely from those of the present invention wherein a softened glass and a molten metal are elongated together, the resulting cross-section of the elongated materials being maintained uniform throughout the process by means of a follow-up or feed-back device.

In accordance with the foregoing considerations, objects of the invention are to provide a method of producing continuous lengths of a metallic filament or a plurality of such filaments encased in a glass, the filaments having a constant cross-section throughout their length, being of microscopic-to-sub-microscopic cross-section, and adapted, where assembled in slightly spaced lateral relation with other like filaments, to polarize radiation within the optical spectrum; to provide filaments of the character described arrayed as a grid in parallel relation and having a microscopic-to-sub-microscopic constant spacing; to provide filaments of the stated description having a diameter within the range of .005 to .05 micron; a spacing within a similar range, and a period (diameter plus spacing) within a range of .01 to .1 micron; to provide glass encased metallic filaments of the nature described wherein the metal of the filaments has a melting point below that at which the glass softens to a drawable or elongatable state; to provide a practical method of producing light polarizers of a linear type comprising a metallic grid embedded in a relatively hard, abrasion-resistant material transparent to the radiation to be polarized; to provide such polarizers which are adapted to polarize at wavelengths in the ultraviolet, the visible and the near infrared; to provide a method of forming a metal-in-glass type of light polarizer in which glass elements are supplied with metallic cores, are heated, elongated, sectioned, sealed, combined, compressed, welded together and annealed, in steps which are repeated several times to obtain the fineness and minute spacing required of the cores to form a unitary light-polarizing structure of the nature described and having sizeable overall dimensions; to provide a highly-stable, linear light polarizer of the character described composed of a plurality of generally parallel microscopic metallic filaments or cores embedded in or encased by one or more plates or shaped optical elements of glass or quartz, each filament extending as a substantially continuous component across the area thereof and having a microscopic-to-sub-microscopic cross-section and spacing relative to a next adjacent filament; to provide a light polarizer of the aforesaid type wherein the spacing between and diameter of the metallic wires or filaments is appreciably less than the wavelength of the radiation to be polarized; to provide such a light polarizer in which the metal or alloy employed in the grid has a lower melting point than the softening point of the glass and which, when viewed as a large area, is extremely opaque relative to, and highly reflective of, the radiation to be polarized; to provide glass-encased metallic filaments, as described, wherein the metal is of a type providing a silvery reflection of visible and ultraviolet light, has a coefficient of expansion at its melting point similar to that of the glass, has a boiling point far above the softening point of the glass, serves, when molten, to wet the glass, and is substantially chemically inert relative to the glass; to provide a light polarizer, as described, which possesses optical properties of a nearly neutral density at extinction and satisfactory to exceptional performance parameters of polarizance, transmittance and density ratio; to provide a light polarizer which is adapted to grinding or molding to various surface contours; to provide a light polarizer of the character described wherein the metallic grid is composed of lead or of an alloy comprising lead; to provide a light polarizer, as stated, wherein the metallic grid comprises a precious metal; to provide a light polarizer of the category described having a high transmission for radiation in which the electrc vector or vibration direction is substantially perpendcular to the longitudinal direction of the elements of the metallic grid; to provide an apparatus adapted to produce an essentially continuous length of a microscopic-to-sub-microscopic filament having a constant cross-section throughout its length; and to provide an apparatus adapted to produce a continuous length of a strip in which are encased a plurality of such filaments in parallel longitudinal relation, all of the filaments being of a generally constant cross-section and having a constant spacing throughout their length.

Other objects of the invention will in part be obvious and will in part appear hereinafter.

The invention accordingly comprises the process involving the several steps and the relation and order of one or more of such steps with respect to each of the others, the apparatus possessing the construction, combination of elements and arrangement of parts, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a diagrammatic perspective view of an apparatus for continuously elongating the assembly of FIG. 3 or a strip having a generally rectangular cross-section and containing a plurality of parallel metallic filaments lying in a plane therewithin;

Figure 1:
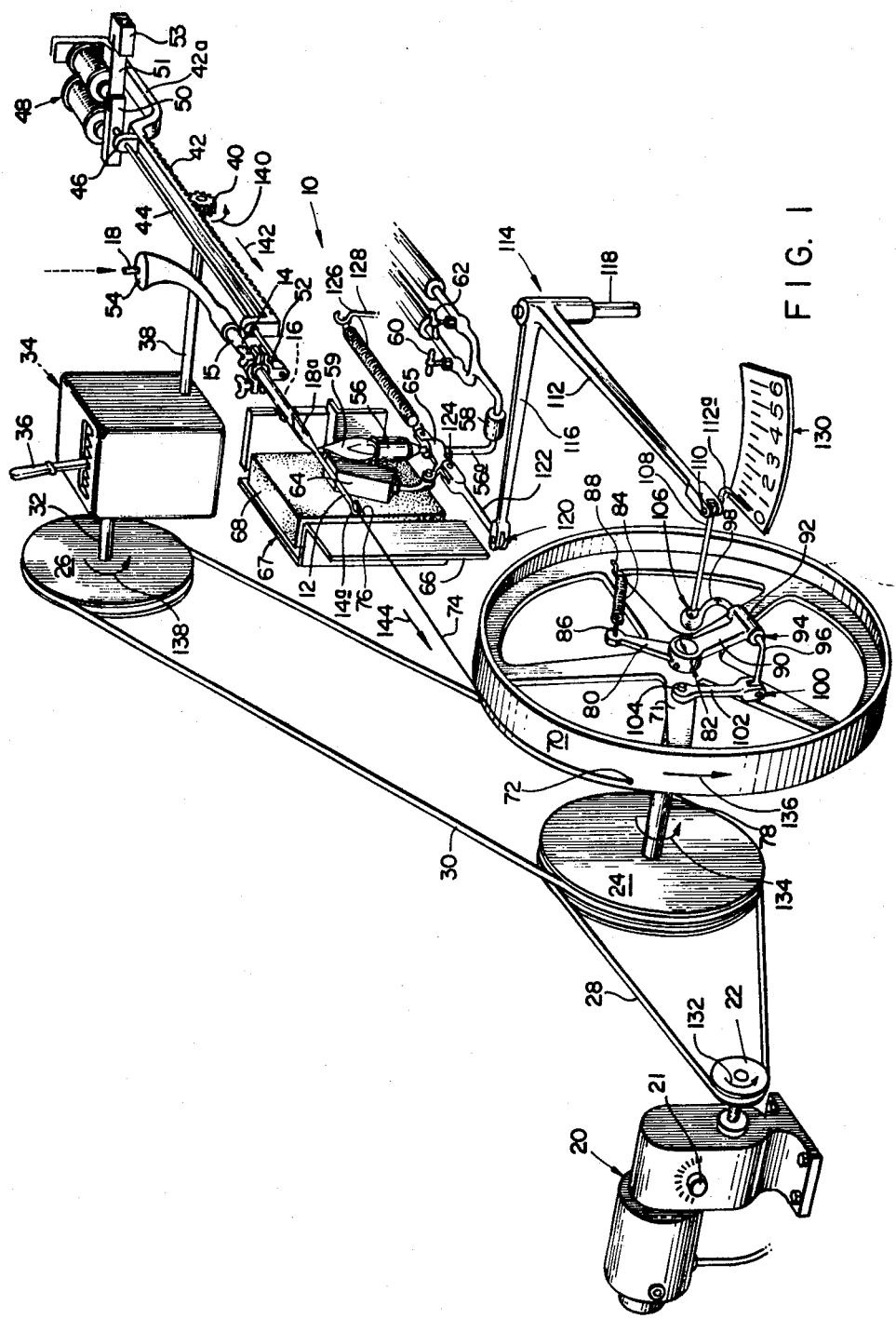
FIGURE 1 is a diagrammatic perspective view of an apparatus for continuously elongating a glass-encased metallic filament.

As previously intimated, in light polarizers of the type contemplated herein, it is essential that the diameter of and spacing between the individual metallic filament which, together, constitute an array or grid of electric conductors, and the repeated period thereof throughout the area, be less than the wavelength of the radiation to be polarized and that, in general, the smaller the period the greater is the ability of the polarizer to polarize at the shorter wavelengths. In general, a spacing of one-quarter of the minimum wavelength of the radiation to be polarized has been found to be effective. If, for example, the width of the grid repeat period were equivalent to the wavelength of the incident radiation, providing the so-called cross-over point of transmittance values $K_1$ and $K_2$, or if it were greater than the wavelength, the polarizance of the polarizer would be low at that wavelength and no effective density ratio could be achieved. It follows that, in general, the finer the diameter and spacing of the filaments, with respect to the wavelength of the incident light, the higher the density ratio of the polarizer and that, given a certain period composed of a filament diameter and its spacing from the next filament, the density or dichroic ratio increases with the wavelength. In the visible range, this, of course, may entail a filament period of approximately .1 micron, with possibly smaller values as, for example, to .01 micron for the ultraviolet, the smaller values also serving to obtain improved dichroic ratios. While the filaments may be so minute as to make their actual cross-section or diameter difficult to measure precisely, a diameter thereof which is one-half of the aforesaid periods will thus be regarded as suitable. For a more detailed consideration of the factors underlying a light-polarizing grid structure, reference may be had to the aforementioned abstract of Bird and Parrish.

In brief, the present invention encompasses the procedures of first elongating or drawing out, under carefully controlled applied heat and tension, a single glass-encased metallic filament or several such filaments held together in parallel spaced relation in or upon a glass supporting element; the cutting into sections of the elongated filament or filaments and sealing an end thereof against dissipation of the metal under heat; the combining of the filament sections with other like filament sections in parallel relation on a new glass supporting element; their compression and compacting, and their being welded together and annealed under given temperature conditions. The process of elongating, cutting, sealing, combining, compressing, welding, and annealing is then repeated, en toto, as many times as necessary, that is, until repetitions of the elongation step thereof have produced filaments with a repeat period such as the aforementioned .1 to .01 micron or smaller or larger dimensions beyond the visible spectrum, and repetitions of the cutting, combining and other steps have produced a unitary glass-encased light-polarizing grid composed of a large number of the finally elongated sections in a lateral array, together forming an overall area of a size commensurate with that which is desired.

Attendant upon the process, as above outlined, are several factors or requirements of importance relative thereto. One is a substantial maintenance of the dimensional ratio between the metal and glass components throughout the several elongations, or at least following a first elongation, as by insuring their performance within proper temperature ranges. A second is that of performing each successive elongation at an effectively lower temperature than its predecessor. This is preferably achieved by keeping the applied heat constant and increasing the force and speed of the draw, although the temperature itself may be varied, the purpose being to avoid the generation of gaseous bubbles in the glass sheath or metal core, or in both, and to further a higher viscosity of the glass. The latter discourages a surface tension condition between metal and glass which might provide a tendency of the metal to depart from the form of a continuous filament or strand and to assume that of separate globules or droplets, the spacing or gaps between which would be amplified in succeeding elongations and seriously impair or destroy the continuity of filaments and the polarizing properties of the ultimate product. Only at the final elongation may gaps, preferably not exceeding one to two times the diameter of the metal filament, be tolerated. Another requirement is the provision of compressively compacting, welding and annealing under temperatures which, although relatively differing, are all lower than the temperature or temperatures associated with the elongation stage.

The concept of drawing out a moulten metal filament in an envelope of softened glass has been disclosed in U.S. Patent 1,793,529 to George F. Taylor. The method described is limited, however, to the production by a hand-drawing operation of relatively short lengths of considerably larger diameter than those of the present invention and not to a continuous production method for providing extensive lengths of a filament of submicroscopic size adapted to use in forming a light-polarizing grind, or to producing filaments of constant cross-section throughout extensive lengths thereof.

Referring to the drawings, FIGURE 1 illustrates an apparatus 10 for producing a continuous length of a metallic-cored glass filament 12 having a generally constant diameter or cross-section. A fragment of the filament is shown in conjunction with glass and metal components used in its manufacture and in greatly exaggerated dimensions in FIG. 2. The filament, when assembled in side-by-side parallel relation with other filament lengths and further treated, is adapted to provide a metallic-grid polarizer of a type contemplated by the present invention. The apparatus of FIGURE 1 comprises, basically, a supply means for advancing or feeding a length of a glass element such as a tube 14 composed of a glass sheath 15 having a bore 16 into which short lengths or fragments of a metal in a solid state 18 have been introduced, the metal having a lower melting point than the elongatable softening point of the glass; a means for applying a given controlled heat to both the glass container and the contained metal such as to both soften the glass to render it ductile and to melt the metal, the metal being shown in a molten state at 18a; a takeup or tensioning means for drawing the softened glass and contained molten metal into an elongated filament; and a follow-up or feed-back type of compensating means for maintaining a correct balance between the rate of feed and drawing and the temperature of the applied heat, this balance being such as to produce, automatically, a filament having the aforementioned constant diameter and of a length limited only by the supply of materials fed thereto and the capacity of the takeup means. For purposes of illustration, the glass tube 14, prior to its being rendered ductile and undergoing elongation, may be considered as having an outside diameter of from 3/16 inch to 3/8 inch and a bore diameter of from 1/16 inch to 1/8 inch. After its elongation, the tube, in the form of the drawn filament 12, may have an outside diameter of from .015 inch to .020 inch and a bore diameter of approximately .008 inch.

A single motor 20, preferably an electric motor of a continuously-variable-speed type, and having a precise speed control 21, is employed to drive the feed and takeup means of the apparatus through the media of pulleys 22, 24 and 26 and belts 28 and 30 which may, appropriately, be of a "V" type. Pulley 26 drives the input shaft 32 of a variable speed device 34, preferably of a so-called gearbox type, having an adjustment lever 36. The output shaft 38 of the latter, rotating at a given lower speed than the shaft 32, has a pinion gear 40 fastened to its extremity which engages a rack 42. The variable speed device 34, which mechanically couples, and permits different rates of input and output, provides a range of rotational speeds of pinion 40 with respect to that of input shaft 32 to primarily control the stretch ratio of the tube 14. It may be of any conventional type as long as it is capable of precise settings at the ratios desired and adapted to maintain such settings without variance. A rod 44 is so mounted by a pair of supports or brackets 46, extending from the rear surface of the rack 42, as to be incapable of rotation, as by key means, not shown, but adapted to undergo a very limited slidable movement in a longitudinal direction responsive to energization of an electromagnet 48 mounted on an extension 42a of the rack element 42. The armature 50 of the electromagnet is fixedly attached to one end of the rod 44 and the aforesaid slidable movement of the rod is merely to the degree caused by movement of the armature. The other end of rod 44 is attached to the padded clamp 52 in which the glass tube 14 is mounted. A flared funnel-like element 54 fitting over the end of tube 14 enables the small sections or slugs 18 of the metal which is to be employed in forming the metallic core to be slidably inserted, at will or automatically in the tube. The metal should have high reflective properties in bulk and be of a type having no greater reactivity with oxygen than any metals whose salts may be involved in the structure of the glass, such, for example, as a lead-tin, a lead-tin-bismuth, a tin-antimony, or a lead-tin-antimony alloy, it being essential, as previously intimated, that the chosen metal or alloy have a lower melting point than the softening point of the glass. An ideal alloy for the purpose is one that neither shrinks on melting nor expands on solidifying to an appreciable extent. A wide choice of glasses may be utilized. The boro-silicate glass having the trade name "Pyrex" or the potash-soda-lead glass designated "No. 0120," both manufactured by the Corning Glass Works, Corning, New York, U.S.A., may for instance, be employed under widely different temperatures within the scope of the invention. Assuming the following temperatures to be in centigrade, the glass "No. 0120" has an annealing point of 435°, a softening point of 630° and a so-called working point of 975°; the Pyrex glass has an annealing point of 565°, a softening point of 820° and a working point of 1220°.

The electromagnet 48, in conjunction with the rod 44 and clamp 52, serves the function of causing the glass tube 14 to vibrate, concurrently with the drawing operation, to facilitate release of gas bubbles through or from the molten metal 18a. To produce the desired vibrational effect, the electromagnet may, for example, include make-and-break circuit means (not shown) responsive to a direct current or it may be of a type directly responsive to the surges of an alternating or pulsating current, or of any other type providing suitable high-frequency or ultra high-frequency vibrations. Frequencies of 60 cycles to 25 kilocycles per second have been employed, the higher frequencies generally being preferred. A centered position of the armature 50 is provided by the flat spring 51 mounted on the fixed block 53. The rack 42, electromagnet 48, rod 44 and clamp 52 serve together as a carriage enabling the forward movement of the glass tube 14 in response to rotation of pinion 40. Fixed bearing means for these elements and supporting framework, as well as bearing means for rotatable shafts and the like of the apparatus, while understood to form a part thereof have generally been omitted in both FIGS. 1 and 4 as nonessential to an understanding of the structure and operation and because they would obscure certain of the essential elements.

The heat-applying means of the apparatus comprises a burner 56, the supply line or inlet portion 56a of which is pivotally mounted in air-tight bearing means at 58 so as to permit its arcual movement generally back-and-forth in line with, that is, along a given length of the glass tube 14 in underlying relation thereto, thus enabling variation of the point or area at which the maximum heat zone of the flame 59 is contiguous with the glass tube and, to an extent caused by the arcual nature of the movement, varying its proximity thereto. A suitable fuel such as a gas mixed with air or oxygen, in proper proportion and capable, for example, of producing an oxidizing flame having a temperature or temperatures of predetermined degree, as, for example, of the order of from approximately 500° to 1200° centigrade, depending on the materials to be treated, the stage of treatment, the speed of advancement, etc., is provided by control valve means 60 and 62 of the fuel inlets, one valve controlling a supply of gas and the other of air, or oxygen, or a mixture of the two. It is to be understood that all heating functions assigned herein to a burner may, alternatively, be performed by an electrical radiation heater. A shield or baffle 64, formed, for example, of a rectangularly shaped block of carbon terminating in an acutely-angled or tapered face adjacent to the materials undergoing elongation, is mounted on a bracket 65 attached to the burner portion 56a at an acute angle which brings the aforesaid face generally parallel with the materials, the baffle being movable with the burner in the directions above described to facilitate a correct application of heat to the glass tube by providing a rather sharp cutoff thereof. Further reference to movement of the burner will be given, hereinafter, when describing the follow-up or compensating means of the apparatus. The heat-applying elements, including at least the burner 56 and shield 64, are preferably mounted in an enclosure 67, shown in part only, the enclosing elements 66 and 68 thereof being composed of metal and refractory materials, respectively, and having suitable entrance and exit apertures, not shown in detail, for the materials undergoing treatment. The enclosure 67 contributes to an even application of heat by eliminating convection currents, drafts, and the like and providing a more stable environment with respect to functional temperatures.

The principal take-up or tensioning element of the apparatus for drawing out the metal-core filament 12 is the drum or reel 70. A leading, preformed, curved end or hook 14a at a preliminary drawn out portion of the glass tube 14 is initially connected to the drum 70 through the intermediary of a cable 74, one end of the cable being attached to a pin 72 on the periphery of the drum and engaging hook 76 at the other end of the cable gripping the hook 14a of the glass tube. It will be understood that once the cable has been taken up by the drum 70, the elongated filament itself is wound on the drum, the materials and fineness of the filament rendering it sufficiently flexible for the purpose. The driving means for rotating the tensioning drum 70 comprises the shaft 78 integral with the driven pulley 24. However, drum 70 is not directly coupled to shaft 78 and is actually rotatably mounted thereon, a connecting means with shaft 78 for providing rotation of the drum including, respectively, an arm element 80 of a bell-crank 82, the bell-crank being fixed to the extremity of shaft 78 so as to rotate with it, and an extension spring attached at one end to an eye 86 formed at the tip of the arm 80 and, at the other end, to a hook 88 located at an inner surface adjacent to the periphery of the drum 70. Thus, rotation of the takeup drum 70 is not necessarily at all times simultaneous or in direct conformance with that of the shaft 78 but may commence later or lag behind it because of an undue resistance to its rotation attendant upon the drawing-out process. Any such delay or lag is accompanied by an extension of spring 84 until the elasticity of the latter assumes command and provides the necessary torque to the drum 70, at watch time, assuming a sufficient softening of glass and metal undergoing elongation, the drum commences to rotate and may, at first conceivably, accelerate slightly with respect to the rotation of shaft 78, the foregoing lag or acceleration being due to the degree of high or low resistance, respectively, of the metal-cored glass tube to elongation at any given moment, according to the solid, ductile, viscous or molten condition of its respective components. The characteristics of the spring 84 may, appropriately, be such as to permit a relative rotation of the shaft 78 and drum 70 of approximately 90° from a given zero position, the spring advantageously being so tensioned that when a so-called "steady state" of elongation has been reached, the drum has been rotated approximately 45° from the aforesaid zero position.

While it will be appreciated that drawing out of the metal-cored filament to a given diameter is primarly achieved by the differential rates of feeding the glass tube 14 and of taking up the drawn filament, assuming a constant application of heat and attendant ductility, viscosity flow of materials, other factors require consideration in maintaining constant core and overall dimensions in a continuous process wherein filaments of a very considerable length are being produced. These factors may include slight inherent dimensional or other variations of the metal or glass as supplied, or the presence of bubbles, or they may be of a mechanical nature identified with the apparatus itself, e.g., of a frictional category, so as to impair even operation. When, for any reason, an imbalance exists between the movement of the metal-containing glass tube and the amount of applied heat, the dimensions of the filament will vary. Too little applied heat or too rapid an advancement accompanied by too cold a tube at the area to be softened produces a drawn filament portion of relatviely large cross-section and vice-versa. Also, if, during advancement, a bubble is encountered in the glass or metal core, the so-called specific heat mass is lowered, viscosity of the material is lessened, and the cross-section of the filament would be momentarily diminished if compensating means were not employed. The importance of achieving dimensional consistency throughout the filament is emphasized because any unevenness in this regard can become greatly accentuated in subsequent drawing-out steps and can seriously impair the quality of the ultimate light polarizer. Follow-up or feedback means of the apparatus for maintaining dimensional uniformity of the elongated metal-cored filament will now be described.

The bell-crank 82, as previously explained, is fixed to the shaft 78, and rotates therewith. An arm 90 of the bell-crank includes a tubular bearing portion 92 at its outer extremity. A second bell-crank 94 is mounted for rotation, at a central cylindrical bearing portion thereof, in the tubular bearing 92 and includes arms 96 and 98 extending relatively at approximately 90°, but spaced so as to move in separate planes, as provided by the length of said central bearing portion 92. The arm 96 is pivotally attached at its outer extremity by a yoke 100 to one end of a connecting rod or link 102. A perforation at the other end of link 102 is rotatably mounted on a pivot pin 104 extending from a spoke 71 of the drum 70 in a direction parallel to the drum axis, the pin being located on the spoke adjacent to the hub of the drum. The other arm 98 of the bell-crank 94 is somewhat curved and is attached at its outer extremity, by ball-and-socket means 106, located at an extension of the axis of shaft 78, to one end of a connecting rod or link 108, the latter being permitted both rotational and angular movement by the ball-and-socket connection. The other end of link 108 is pivotally attached by a yoke 110 to an arm 112 of a third bell-crank 114. The bell-crank 114, comprising a second arm 116, is mounted for rotation about a fixed spindle 118 extending generally upwardly from the frame. A yoke 120 at the outer end of arm 116 provides a pivotal connection with one end of a link 122. The other end of link 122 is pivotally connected by a yoke 124 to the bracket 65. An extension spring 126, under a tension determined by a "steady state" of operation, as previously mentioned, is connected at one end to the bracket 65 and at the other end to fixed holding means 128, attached to the apparatus supporting framework, not shown. The bell-crank arm 112 extends beyond the yoke 110, joining it with link 108, so as to terminate in a pointer 112a which is adapted to move across a suitably calibrated scale 130, as for example, one containing indicia in terms of ounces or pounds.

The direction of travel of the glass tube 14 and the elongated filament 12 is preferably inclined downwardly, e.g., at an angle of approximately 60° with respect to the horizontal, to facilitate slidably feeding the metallic pieces 18 toward the end of the glass tube 14 which is undergoing heating and to aid in the release of bubbles of gas upwardly through the molten metal and through the open end of the glass tube 14. One way of achieving this is to tilt the entire apparatus, as illustrated. However, only those elements of the apparatus directly concerned with the feeding, heating and drawing of the filament actually need be thus disposed to achieve the desired result.

Operation of the follow-up correcting means for maintaining a uniform cross-sectional filament structure throughout its length will now be described. The hereinafter stated directions of movement of mechanical elements and materials undergoing treatment are applicable to the view of FIGURE 1. Let it be assumed that the apparatus is in operation, thus providing movement of certain elements of the mechanism in the directions indicated by the arrows 132, 134, 136, 138, 140 and 142 and movement of the glass tube 14 and elongated filament 12 in the direction 144. Although moving in a similar direction, the speed at which the glass tube 14 is introduced is slower than that at which the metal-cord filament 12 is drawn out, as previously stated, and the rotation of the drum 70 is subject to the reservations of lag and acceleration relative to the rotation of shaft 78, mentioned hereinbefore.

At the beginning of the operation, the glass of tube 14 may not be thoroughly heated and, therefore, it will have insufficient ductility and resist drawing strongly. Thus, there is an initial reluctance or outright inability of the drum 70 to rotate in the direction of arrow 136 as urged by the bell-crank arm 80 through the medium of the connecting extension spring 84. Instead of the drum's rotating, therefore, the spring 84 commences to extend, as caused by the positive rotation in the direction 134 of the bell-crank 82, fixed to the shaft 78. When the spring 84 reaches a given extension and tension, it produces a pull upon drum 70 strongly urging the latter to rotate, that is, it provides a rotational force, which exceeds the resistance of the incompletely heated glass of the tube 14. In effect, it produces, ultimately, a substantial equivalent of a direct connection between the drum 70 and shaft 78, and, assuming the glass and metal to be sufficiently softened as described below, the drum 70 commences to rotate in the direction 136.

The drum 70 would not start to rotate, however, nor would the glass of tube 14 begin to be drawn out properly, but might, conceivably, break, were it not for an additional sequence of adjusting or compensating steps of a follow-up nature accompanying those above stated, which rapidly and automatically render the materials adapted to elongation. Let it again be assumed that certain of the above-described operations are taking place, namely, that the drum 70 is stationary due to a strong resistance to drawing of the glass-enclosed metal; that the bell-crank 82 is rotating in the direction 134, and that the spring 84, connecting the bell-crank and drum, is undergoing elongation and, therefore, an increasing tension. Concurrently with the aforesaid operations, the arm 90 of bell-crank 82 is caused to move arcually in a counterclockwise direction thus causing the tubular bearing portion 92 to be moved translationally in a similar direction so that it is increasingly spaced from the pivot pin 104. Accordingly, the arm 96 of the bell-crank 94 is caused to pivot upwardly or, as viewed from the near end of the apparatus, in a clockwise direction, as permitted by the rotational mounting of the bell-crank in tubular bearing 92 and by the yoke 100, the other arm 98 of the bell-crank at the same time being caused to pivot forwardly or, in a clockwise direction, as viewed from the near end of the apparatus, so as to cause a generally forward and rotational movement of the socket component of the ball-and-socket connection 106, the forward movement being, in general, along an extension of the axis of shaft 78. This actuates the link 108 to move effectively linearly, also in a forward direction, causing the bell-crank 114 to pivot in a counterclockwise movement, the arms 112 and 116 and the pointer 112a moving arcually therewith in a counterclockwise direction. Concurrently, the link 122, actuated by the bell-crank arm 116, is moved in a direction toward the drum 70, generally to the left as illustrated, causing the burner 56 and baffle or shield 64, as permitted by the pivotal mounting means 58, to move arcually along the under surface of the filament 12, in the direction of advancement or elongation of the latter, that is, to the left, as illustrated, and to alter the functional position of flame 59 accordingly. The aforesaid movement of the burner and flame increasingly stretches the extension spring 126 and places it under a further tension. Simultaneously, the pointer 112a is caused to move across the scale 130, through the aforesaid clockwise rotation of arm 98 and ensuing linear movement of link 108, by an amount which indicates the force of the draw in ounces or pounds, as calibrated, which is exerted on the materials undergoing elongation. The extension springs 84 and 126, in addition to performing the biasing functions described, also serve to prevent backlash throughout the various interconnections of the follow-up mechanism.

The above-described movement of the burner 56 and flame 59, to the left, applies a moving heat zone to an elongated portion of the materials having a reduced mass such that the applied heat produces a rapid and pronounced change in temperature of the glass-enclosed metal. For example, for a given unit length, the volume may, through a twenty-five times drawing out of the glass and metal have been reduced to a twenty-fifth of its previous volume and its cross-sectional dimension to one-fifth of its previous cross-section. This produces a rapid softening of the glass and melting of the metal therewith-in and, accordingly, reduces the resistance to drawing out to a degree such that the then-existing tension of spring 84 is sufficient to cause the drum 70 to rotate. If maintained, however, the location of the applied heat of flame 59, just described, is one whereat the volume or mass of the glass-encased filament is so small as to become overheated, resulting in an undue lowering of viscosity of the glass. If kept at this location, the flame would provide a softening in excess of that permissible. This condition is remedied by a movement of the burner and flame again toward the undrawn larger portion of the tube and contained metal and occurs as follows. Upon rotation of the drum 70, thet pivot pin 104 and the tubular bearing portion 92 are caused to move, relatively, toward one another to a closer spacing, under bias applied by the stretched extension spring 84. This causes pivotal movement of the bell-crank 94 in a counterclockwise direction, again as viewed from the near end of the apparatus, through the medium of the pivotal connection at 100 of the bell-crank arm 96 and the link 102. The bell-crank arm 98 is thereby caused to move generally inwardly toward the hub of the drum, pulling link 108 with it, and actuating the bell-crank 114 to pivot in a clockwise direction, with accompanying movement of the link 122, movement of the latter being favored by the tensioned extension spring 126. These operations, as above indicated, are such as to move the burner 56 in a direction opposite to that in which it, previously, had been moved, namely, in a direction toward, or opposite to advancement of, the undrawn glass tube 14, and may well bring the functional tip of the flame 59 beneath the greater mass of the larger, essentially non-elongated leading portion of the glass tube containing a section of the solid metal 18. The approach of the flame from an overheated, softened zone of the filament toward an unmodified portion of the glass tube containing the solid metal and vice-versa, is very rapid when compensating for variations or irregularities of the glass structure such as may be due to bubbles, gaps or the like in the materials undergoing elongation. A rapid "hunting" movement of the flame occurs in the two directions described until a "steady state" or condition of equilibrium is reached at which the zone of heat application, the speed of the driving motor, the relative speeds of input and output and the drawing-out force are all relatively correct and balanced so that a filament of an extensive length and constant cross-section is produced.

While the above mechanisms have principally been described with respect to the starting stage of operation of the apparatus and establishing an initial drawing out of the filament, it has been shown that they also function automatically during a continuous operation when, for example, any inconsistency of the supplied glass tube or contained metal is of a nature to influence a momentary overcooling or overheating thereof. Unless compensated for, these inconsistencies would alter the cross-sectional dimension of the filament. As previously intimated, when, for example, the presence in the advancing materials of irregularities such as bubbles or gaseous pockets produces a cross-sectional area requiring less heat to soften it, that is, when there is a lowering of the mass or volume, the materials would draw out momentarily to a relatively smaller cross-section but for the rapid automatic movement of the flame away from the aforesaid area and toward a section of the materials having a greater mass.

The drawing out force or "pull," as registered on the dial 130 may be varied by adjusting the speed control 21 which, basically, establishes both the rate of introducing or feeding the metal-cored glass 14 and the rate of taking up the elongated filament 12. Assuming a consistency of the materials which are to be treated throughout their lengths and a given steady heat of the flame 59, the rate of movement of the materials determines their relative warmth or coolness resulting from subjection to the flame and, accordingly, their proclivity or resistance to elongation, it being understood that the resistance of the materials to drawing to some degree, exerts an overall braking force which retards the speed of the pulley 24 and, accordingly, the speed of feed or "input" of the tube 14 as well as the speed of drawing out or "output" of the filament 12. Again assuming a constant heat and uniformity of the materials undergoing elongation throughout their length, the speed control 34 varies the ratio between the speed of introducing the glass tube 14 and contained metal 18 to the flame 59 and that of withdrawing the elongated filament therefrom. Thus, it determines the average degree of elongation. In general, the advancement should not exceed a speed which will permit a substantially complete dissipation through the molten metal of aqueous or gaseous bubbles emitted from the softened glass, or of bubbles originating in the metal itself. As previously mentioned, escape of these bubbles is furthered by the vibratory means 50. Wherein the bubbles are numerous as a result of large amounts of a foreign substance such as water, the vibrations may, advantageously, be generated by a transducer, operating at supersonic frequencies.

The follow-up mechanism for moving the flame 59 along the metal-containing glass to correct either for insufficient softening or an over-softening, both producing unsuitable viscosities and too great or too little a resistance to drawing out, may be of a modified form. Thus, for example, it may involve the use of a photoelectric cell, a responsive electrical circuit and electromechanical actuating means for repositioning the burner 56 and/or the shield 64 as hereinbefore described. In such a device, a beam which is unobstructed only when the metallic-cored glass tube is correctly elongated could serve as the energizing medium for the photoelectric cell circuit. A follow-up mechanism of the general type described constitutes a preferred embodiment, however, because of its relative simplicity and accuracy of operation. By altering the lengths of the various arms and links of the components shown, as by making them manually adjustable, the degree and speed of compensatory movement may readily be varied. One rather obvious modification of the mechanism shown would involve the replacement of extension spring 84 by a coil spring mounted around shaft 78 and attached, respectively, to the shaft and to the bell-crank 82. Another modification having possible advantages would be a linearly slidable mounting for the burner 56 instead of the pivotal mounting shown, e.g., one employing a track so disposed as to enable an exactly linear movement of the burner relative to the materials undergoing elongation. In this instance, a flexible coupling, could, of course, appropriately, replace the coupling 56a as a fuel supply means.

Assuming the metal-cored filament, produced by the operations above described, to be the primary component of the ultimate light-polarizing grid, the next stages broadly involve operations of cutting the long metal-cored filament into a number of individual shorter filaments of uniform length, assembling and holding the cut filaments in contiguous parallel relation on a supporting plate composed of a glass similar in composition to that of the filaments, heating and drawing out the thus-held filaments and supporting plate to provide a unitary elongated and narrowed strip, cutting the strip into sections, sealing both ends of the sections, grouping a plurality of the sections in abutting relation on another supporting glass plate of a similar composition, compressing, welding and annealing the sections, and repeating the elongating, cutting, sealing, assembling, compressing, welding and annealing steps until a glass-enclosed metallic grid, having a fineness and spacing of its metal filament components enabling the polarization of radiation in a given desired range of the spectrum and a sufficient overall area, has been produced. To achieve this result, practically, entails a manufacturing operation involving a plurality of individual elongation steps interspersed with the steps of reestablishing the widths and thicknesses which have preceded each elongation and which have been diminished thereby. The fineness of filaments and spacing therebetween required could not readily be obtained in a single draw except by a very large and powerful apparatus adapted to accommodate materials of tremendous initial dimensions. Moreover, the extreme reduction in thickness of the glass would make it so thin and fragile as to be very difficult to handle. However, the dimensional characteristics of the materials produced and the size and power characteristics of the apparatus for producing them are somewhat relative matters and, assuming the practicability of an enlarged apparatus of the general type described herein to enable a reduction in the number of the required stages of elongation, the present invention is regarded as contemplating such a possibility.

Figure 3:
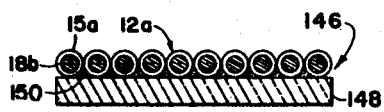
FIG. 3 is a diagrammatic cross-sectional end view of an assembly of elongated metallic-cored glass filaments mounted on a glass support.

An end view of the assembly 146 composed of the filament segments or sections 12a, having glass portions 15a and metal portions 18b, arranged on the supporting plate 148 and preliminarily held thereon prior to heating and elongation by an adhesive substance 150, is shown, preparatory to its elongation, in FIG. 3. It is illustrated during elongation and narrowing in FIG. 4, and after the last-named treatment in FIG. 5. By way of example, the filaments 12a of FIG. 3 may be considered as having an outside diameter between .01 inch and .02 inch and a length of approximately 10 to 12 inches. It is important relative to the efficiency of the final structure that the area of the plate 148 be exactly that of the total number of filaments 12a mounted thereon so that no overlap or under-coverage exists. The adhesive 150 may be of any type which is adapted to hold the filaments 12a in place until they are at least partially welded to the base 148 and which will then evaporate or burn off without causing discoloration or other undesirable effects. A clear, bleached beeswax fulfills these conditions. A so-called "glass solder" comprising a powdered glass having a melting point below that of the glass of the filaments and a coefficient of thermal expansion similar thereto may also be employed.

The overall apparatus 152 of FIG. 4 is adapted to perform the operations of repeatedly drawing out strip- or ribbon-like assemblies composed of a plurality of minute glass-encased metallic filaments arranged in parallel relation on, between, or within substantially flat glass supporting or outer layers, the metallic filaments, as in the case of the metal-cored glass filament previously described, having a lower melting point than the softening point of the glass. The apparatus of FIG. 4 is generally similar to that of FIGURE 1, like parts being similarly numbered, excepting for certain modifications thereof particularly due to the altered strip-like form or shape and somewhat different characteristics of the materials being treated. In contrast to the apparatus of FIGURE 1, that of FIG. 4, as above intimated, provides the simultaneous elongation of a plurality of metallic filaments, in side-by-side spaced relation and lying in a given plane, rather than the drawing out of a single glass-sheathed filament. The principal mechanisms of FIG. 4 again fall generally within the categories set forth in conjunction with the apparatus of FIGURE 1, namely, those of supplying a metal-containing glass, applying a heat and elongating force thereto to render the glass ductile and the metal molten, and employing follow-up means to insure cross-sectional uniformity, the latter providing, in this instance, dimensional stability of an elongated ribbon or strip 146a formed from the assembly 146 of FIG. 3, as well as dimensional uniformity of further more extensively elongated strips produced therefrom.

A motor and driving belt, not shown but of a type similar to that of FIGURE 1, is employed to drive the pulley 24, the latter, in turn, driving both the shaft 78, to which it is fixed, in the direction 134, and, by means of the belt 30, driving pulley 26 and input shaft 32 of the variable speed device 34 in the direction 138. The output shaft of the latter, rotating at a given reduced speed as provided by the control 36, drives the pinion 40 in the direction 140, the pinion moving the rack 42 in the direction 142. The strip assembly 146 composed of a plurality of glass-encased metallic filaments on a glass base, as above described, is attached at its trailing end to the rack by a clamp 154. The rack 42 is so slidably mounted on fixed frame portions, not shown, and the strip is so guided as to provide its advancement along a substantially horizontal path, in contrast to the general downward movement of the apparatus of FIGURE 1, until it reaches the heated softening area. It will be noted that no vibratory means of the type of FIGURE 1 is associated with either of the means 154 or 42 for mounting and feeding, respectively, the strip 146, it being generally assumed that the previous vibrational treatment at higher temperatures provided by the apparatus of FIGURE 1 has substantially eradicated any bubbles and that new bubbles will not again be generated to any appreciable extent.

The heat-applying means comprises a burner 156 having a supply line or inlet portion 56a which is pivotally mounted at bearing means 58 to permit the burner to be moved arcually back-and-forth lengthwise of the strip 146 and vary the position of the flame 158 relative thereto. The burner is of a design for providing a broader distribution of heat than that of FIGURE 1, e.g., of a dual type having a pair of screened orifices. The tandem arrangement of the burner elements 156a and 156b along the path of advancement of the strip provides a somewhat progressive softening of the materials thereof to a state of drawability or elongation at a narrow transverse area or band generally overlying the second burner element 156b. A gas and air or oxygen fuel, the supply of which is controlled by the valves 60 and 62 and which, preferably, passes through a diffusing material such as closely-packed fibers within the inlet portions 56b, is again employed. The temperature produced by the flame 158, as previously intimated and given in the "Examples," hereinafter, is preferably somewhat lower than the temperature employed in drawing the filament of FIGURE 1. The shield 64 is similar to that previously described but is positioned somewhat farther below the materials undergoing elongation and generally vertically with respect thereto so as to provide an acute angle of its tapered face relative to the materials and a somewhat less sharp line of demarcation between the heat-applying and cooling zones than was provided by the angle of the shield in FIGURE 1. The burner is contained within enclosure means formed, for example, of metal and refractory wall elements 66 and 68 and having suitable entrance and egress apertures, an entrance port, only, being shown at 160. The enclosure serves to prevent an excessive flow of air currents with an attendant possible deviation of flame directions from those essential to a given heat and its controlled application.

The takeup or tensioning means for drawing out the plurality of glass-enclosed metallic filaments comprises an endless belt 161 composed, for example, of a flexible stainless steel, passing around the wheel 70, which is driven by an electric motor of the type of motor 20 of FIGURE 1, and around the idler wheel 162, the two wheels serving as pulleys and being mounted, respectively, on the supporting frame 164 and the yoke-like mounting bracket 165 bolted to the frame. The effectively integral mounting of the frame 164 and bracket 165 facilitates the maintenance of the wheels 70 and 162 in correct alignment, with their rotational axes parallel. The wheel or pulley 162 is preferably light in weight and mounted for extreme ease of rotation in suitable bearings 166 having lateral-positioning screw and locking means 168 and 170 for establishing its correct lateral location with respect to the wheel 70 thus contributing to the proper tracking of the belt 161. The bearings 166, in turn, are carried by a yoke 172 which is mounted for pivotal movement in a generally horizontal plane by the vertically extending yoke portions 174. A modified bell-crank 176, comprising the horizontal tubular bearing portion 178, the vertical arm member 180 having horizontally-extending portions 182, and the horizontal arm member 184, is mounted in the bracket 165 for pivotal movement in a vertical plane. The portions 174 of the yoke 172 are rotatably mounted between the horizontally-extending portions 182 of the bell-crank 176. An adjusting screw 186, threadedly passing through a fixed projecting portion 165a of the bracket 165 and bearing against the arm member 184, permits positioning of the bell-crank 176 in the aforesaid vertical plane. An adjusting screw 187 with locking nut 188, the screw threadedly passing through an appendage 189 of the yoke 172 and bearing against the arm 180, serves to rotate the bell-crank 176 and thereby increases or lessens tension of the belt 161.

The belt 161 is preferably surfaced on its outer or functional side with a flexible material, such as a synthetic heat resistant rubber or the like, adapted to exert a frictional contact with the glass of the elongated strip 146a. At the beginning of the drawing-out operation, the leading end of the strip to be elongated is attached to the belt 161. This may be accomplished, for example, by manually providing a preliminarily drawn portion 146b of the strip and attaching it to the belt by one or more clips 190 or by any other suitable temporary attaching means. Alternatively, hook or an eyelet may be formed by a preliminary manual drawing-out procedure at a leading end of the strip and attached to the belt by hook and cable means, as described relative to elongation of the single filament of FIGURE 1.

The wheel or pulley 70, rotatably mounted on shaft 78, commences to turn in the direction 136 only when the tension of spring 84a overcomes the resistance to elongation of the strip, as previously described relative to FIGURE 1, the spring, in this instance, being somewhat stronger than the spring 84 of FIGURE 1 because of the greater resistance to drawing out of the plurality of filaments and greater mass of the glass. A smooth-surfaced platform 192 provides both a guide means whereby the clips 190 may slidably advance, without twisting, and a supporting surface for rapidly dispensing any excised imperfect or other sections of the elongated strip. The spacing between the tangential points of contact of the belt 161 with the pulleys 70 and 162 is not critical but may, conveniently, be of some 4 to 5 feet. After its elongation, the strip is cut into sections of chosen length, either before or shortly after its leading edge has advanced beyond the idler wheel 162 as may be most convenient, the clip 190 being repositioned, as required, for the purpose. However, an additional supporting surface or platform, not shown, but located to the left of the appratus, may be provided, in which case the strip may attain a greater length and be sectioned thereon.

The uppermost peripheral surface area of the wheel 70 is positioned below an extension of the above-mentioned plane of the strip 146 during its horizontal movement, prior to softening, by an amount providing a downward angle of the path of advancement of the elongated strip of approximately 5° relative to the aforesaid plane, commencing at the softening band or area adjacent to the burner 156b. The smaller wheel 162 is so positioned with respect to the wheel 70 and the platform 192 is so inclined at the aforesaid angle as to provide an extension or continuation of this slightly downwardly-extending path of advancement. Providing an altered direction of travel of the strip 146 approximately at the point where elongation commences, that is, approximately at the softening area, contributes to the welding of the metal-cored glass filaments 12a to the glass base 148 by forcing the filaments more firmly against the base at an area of curvature than would be the case if the original direction of advancement were continued. The original direction need not be exactly horizontal to obtain the aforesaid result of a change of direction, a generally horizontal original direction merely being convenient. The elongated strip 146a, with the filaments 12b, having metallic cores 18c, thus welded to the base 148a, is shown in exaggerated dimensions in FIG. 5, it being understood that the actual dimensional reduction would be considerably greater, elongations of as much as twenty-five times being customary. Assuming such an elongation ratio, the cross-sectional reduction would be determined by the square root of twenty-five, the width or thickness of the strip and the diameter of the filaments thus being one-fifth of the original corresponding dimensions. An auxiliary element 194 may be provided for contributing to the welding operation in the form of a heat-resistant compressive means, such as the carbon roll 196 rotatably mounted in the yoke 198 to which is fixed the circular shaft 200, the latter being mounted for both longitudinal and rotational movement in the bracket 202 and having a knob 204 for thus moving it. The roll is biased in a direction toward the strip 146 adjacent to the softening area by a compression spring 206, bearing, respectively, against the yoke and bracket, and is positionable either in contact with the strip, by manually pushing the shaft 200 downwardly, so as to insert the small pin 208 which extends from the shaft through the slot 210 formed in the bracket 202, and turning the shaft in a given direction to a limit stop, not shown, on the underside of the bracket. A reversal of these operations removes the roll from contact with the glass strip. The shaft 200 may have a plurality of longitudinally spaced pins or the spring 206 may be of an adjustable type to vary the compressive force. The aforesaid limit stop and mounting means for the pressure roll 196 may include adjustable features, not shown, for facilitating proper tracking of the strip 146, e.g., for providing parallelism and alignment of the axis of roll 196 with the axes of the wheels 70 and 162.

The follow-up mechanism for establishing and maintaining a given dimension of the elongated strip 146a, by moving the burner back-and-forth longitudinally of the strip in the manner previously described, is practically identical, structurally and functionally, to that shown in FIGURE 1 and, therefore, requires no additional description. The control of applied heat, the control of overall speed of advancement of the materials, and the control of differential speeds of supply, as ultimately provided by the pinion 40 and rack 42, and of takeup, as principally provided by the wheel 70, are also similar to those associated with the apparatus of FIGURE 1. As mentioned hereinbefore, the spring 84a is stronger than the spring 84 because it is required to exert a greater force to overcome the greater resistance to elongation of the strip than was required relative to the tube 14 and, accordingly, the indicia of scale 130a represent higher values of drawing force than those of scale 130. The burner of FIG. 4 may also be mounted for movement parallel to, rather than arcually of, the strip, as described relative to the burner 56 of FIGURE 1.

Figure 5:
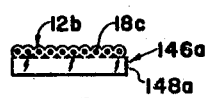
FIG. 5 is a diagrammatic end view of the assembly of FIG. 3, following its elongation.

After completing an elongation of the strip materials, described above with respect to FIG. 4, sections of similar length, e.g., of approximately 10 to 12 inches, which have been cut from the drawn strip 146a of FIGS. 4 and 5 are available for further assembly and elongation after the cut ends of each have been sealed, as by an application of heat to provide a melt of glass across the open ends, to prevent escape of the metal during the next stage of treatment. The sections are then arranged in side-by-side contiguous relation, with their metallic filaments parallel, on a plate composed of a similar glass of a thickness somewhat greater than that of the sections and of a width slightly less than the overall width of the assembled plates. They are held thereon by a suitable adhesive, such as the clear beeswax, previously mentioned. An assembly 146b comprising the unitary strips 146a, assembled on the new base 148b, is shown as a fragmentary portion in FIG. 6. The number of such strips arranged in side-by-side relation is discretionary and depends on dimensional considerations, five strips, thus arranged, being shown in FIGS. 7 and 8. A consistency of supporting strip dimensions and draw ratio throughout a succession of elongations may be taken as generally desirable from a production viewpoint.

Figure 6:
FIG. 6 is a diagrammatic end view of a plurality of elements similar to that of FIG. 5, mounted on a glass base.

As assembly of strip sections and base of the type described with respect to FIG. 6 usually has certain irregularities requiring correction such, for example, as an unwanted spacing 211 between edge portions of the sections or a slightly raised condition of one or more of the sections with respect to the supporting plate which might result in the formation of undesirable air pockets and optical discontinuities therein or irregularities of contour. These faults can be remedied by subjecting the assembly to given heat and compressive compacting forces. After compressing and compacting the elements, it is necessary to weld the strips together and to the base and to anneal the assembly to eliminate strain patterns. All of these functions are performed in an oven 212. The oven, shown merely diagrammatically in FIG. 7, comprises a plurality of compression-applying elements such as a plurality of blocks composed of refractory material or of a metal such as cast-iron, including the stationary supporting block 214 and the movable blocks 216, 218 and 220, the block 214 resting on an inner surface of the enclosing structure or housing 222; the block 216 being slidably mounted on the fixed platform 223; the block 218 bearing upon the assembly 146b; and the block 220 being slidably mounted on the block 214. When the oven is brought to a temperature sufficient to slightly soften the glass, for example, in the neighborhood of 500° centigrade for the glass "No. 0120," as by electrical heating elements 224, or by gas or fuel-oil-heated components, suitably associated with or incorporated in the blocks and/or housing, the blocks 216, 218 and 220 are moved, under bias applied, for example, by weighted levers or by hydraulic, compression-spring or other suitable means, not shown, in the directions of the arrows 226, 228 and 230, thus effecting the compacting operation. The temperature of the oven is raised, e.g., to 550°, the compressive forces being maintained, to perform the welding step. The oven is then allowed to cool to an annealing temperature, for example, of about 435° and, from this temperature, to cool sufficiently gradually to complete annealing of the compacted and welded assembly. After grinding off any external burrs, the assembly of FIG. 8 comprising the attenuated filaments 18d embedded in glass, in general, no longer reveals the tubular glass structure of the individual filaments and is substantially free of internal gaps, surface irregularities, or other imperfections. The small triangularly-shaped areas between the filaments, previously containing the adhesive 150, completely disappear at this or a subsequent elongation, the adhesive therewithin evaporating at a temperature below that at which the glass softens. The separation lines shown between the contiguous sections and between the sections and base have been retained in the drawing for illustrative purposes only, it being understood that these components become welded together and their boundaries would cease to be visible. The individual metallic filaments 18d would also be invisible at this stage excepting under a microscope. They are shown in FIG. 8 and in succeeding figures merely to indicate the structure.

Figure 8:
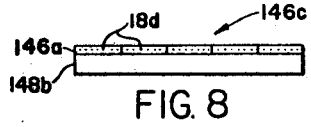
FIG. 8 is a diagrammatic end view of a product treated in the oven of FIG. 7.

The compacted strip 146c of FIG. 8 is then elongated in the manner of the strip 146 and by the apparatus of FIGURE 4, but at a slightly lower temperature of the flames 158 than that of the previous elongation, primarily by keeping the mixture of fuel obtained through adjustment of the valves 60 and 62 constant and, as may be advisable, by making slightly increased speed adjustments of the driving means so as to increase the drawing force. During this and subsequent elongations, it is unnecessary to provide the previously described downward inclination of 5° of the strip from the softening zone onward, as no functional result occurs therefrom, but the changed direction may be allowed to occur without altering the position of elements of the apparatus producing it without any harmful effect, or, alternatively, adjustable means may be provided for raising the wheels 70 and 162, the platform 192, and the elements or parts associated therewith to provide both the supply and elongation of the strip in a single plane.

The elongated strip 146c of FIG. 8 is again cut into sections of a given length. The sections are arranged and held, in parallel relation, on a new supporting glass plate of similar composition. This assembly of sections is compacted in the oven and again elongated by the apparatus of FIG. 4, as previously described, at a slightly lower temperature than the previous elongation. The aforesaid sequence of elongating, cutting, sealing, reassembling, compacting, welding and annealing procedures is continued until, ultimately, a plurality of final sections 146d is produced which, after assembly on a new base 148c and final compacting, welding and annealing operations, forms the linear light polarizer 146e of FIG. 9 in which the transmitted electric vector or vibration direction may be considered as substantially perpendicular to the long direction of the sections 146d and the filaments which, as will be understood, extend longitudinally therewithin. A polarizing element of the type thus produced has an ability to polarize light in the special range desired, has an adequate density ratio, a predetermined overall area, and possesses an acceptable uniformity of polarizing characteristics throughout the area. The polarizer can also function as a polarizing beam splitter, since it partially reflects radiation having its electric vector parallel to the filaments. The completed polarizer 146e is shown, diagrammatically, the individual filaments, of course, being invisible because they are microscopic or sub-microscopic and the lines joining the sections 146d with one another and with the base also actually being generally imperceptible because the elements are welded together. In accordance with the process, above described, it will be understood that each of the sections 146d is composed of a plurality of smaller sections each of which, in turn, has been produced through the aforesaid repeated operations of elongating cutting, sealing, reassembling, compacting, welding and annealing. Where it is desired to provide a polarizer having an opacity at the shorter wavelengths in excess of that attainable with one layer of filaments, that is, with the filaments lying in a single plane, two or more structures of the type of FIG. 9 may be superimposed and fastened together for the purpose, as long as all of the filaments are maintained in parallel relation.

Figure 7:
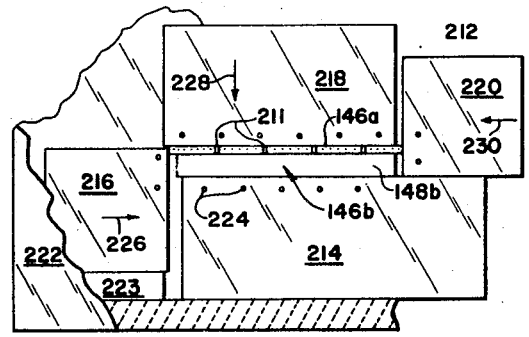
FIG. 7 is a diagrammatic side view of an oven for compressing, welding and annealing products of the invention.
Figure 10:
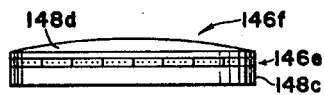
FIGS. 10 and 11 are diagrammatic side views of optical elements embodying light-polarizing components of the invention.
Figure 9:
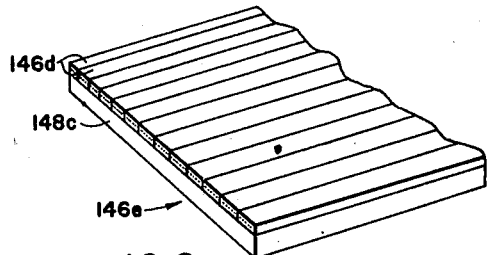
FIG. 9 is a diagrammatic perspective view of a light-polarizing product of the invention.
Figure 11:
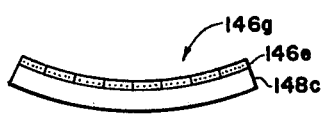

In FIG. 10 there is shown a light polarizer 146f, generally similar to the polarizer 146e of FIG. 9 but having a shaped glass plate 148d welded, as in the oven of FIG. 7, to a side opposite to that of the aforementioned base plate. After being welded and annealed to form a unitary structure, it may be assumed that the plate 148d has been ground or molded so as to constitute a lens, it being possible to form any type of lens, prism or other optical element in this manner. It will be understood that the plate 148c may also be a shaped element or that the plate 148d need not be shaped but merely serve a protective function. FIG. 11 represents a light polarizer 146, of the general character of that shown in FIG. 9 but of a curved form, as produced, for example, in an oven wherein the polarizer is softened and shaped upon or between suitable heated contouring elements.

Figure 2:
FIG. 2 is a diagrammatic fragmentary side view, principally in cross-section of metal-containing glass tube prior to and during its elongation.
Figure 12:
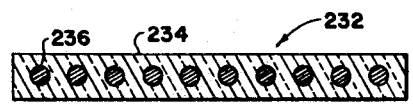

The strip-like structure 232 of FIG. 12 constitutes an important modification of the invention in that its employment would render the apparatus of FIGURE 1 and the product stages illustrated by FIGS. 2 and 3 unnecessary. By employing the strip 232 as the initial element subject to elongation, the drawing out of a single filament, cutting it into sections and arranging the sections on a glass supporting plate prior to their elongation is obviated. The strip of FIG. 12, which in a sense may be considered a functional equivalent of the assembly of FIG. 3, is composed of a glass enclosing body or sheath 234 having embedded therein and lying approximately in a single plane, a plurality of metallic filaments 236. The filaments are formed of a suitable metal having a lower melting point than the softening point of the glass, such as a lead-tin, a tin-antimony, or a lead-tin bismuth alloy, the glass being of any tape adapted to use therewith as, for example, a potash-soda-lead glass. The strip 232, having, for example, a length of approximately 10 inches, a width of 1 inch and a thickness of ⅛ inch, may be supplied in a form having a plurality of empty bores of approximately 1/32 inch, extending longitudinally and in parallel relation therewithin and sealed at both ends after insertion of the metal or alloy, as solid pieces, in powdered form, or in a molten state, assuming preheating of the glass, followed by elongation steps of the character previously described. Alternatively, the strip 232 may be initially provided to include the preformed metallic filaments, as by a separate manufacture. If strips are supplied merely with the bores formed therein, the metal may be inserted in the bores and drawn in a molten state in a preliminary operation of the order described herein relative to the apparatus of FIG. 4, but embodying the tilt of approximately 60° and, as found contributory to the elimination of bubbles, utilizing the vibratory means of the apparatus of FIGURE 1, the metal being inserted through an open end of each bore. Assuming the strip to have continuous metallic cores already formed therein, the apparatus of FIG. 4, essentially as shown, is suitable for performing the initial and subsequent elongations, it being unnecessary to provide the downward path of 5° relative to the path of supply, however. Inclusion of the vibratory means would be optional. After the strip 232 has been elongated, it is cut into sections of a given length, the sections are assembled and held on a new glass supporting plate and are compacted and welded in the oven of FIG. 7, the various steps being repeated in the manner hereinbefore described until the final polarizer, having the intended characteristics and generally resembling that of FIG. 9 is completed.

EXAMPLE I (1) A round, hollow glass tube, composed of a potash-soda-lead glass "No. 0120," manufactured by Corning Glass Works, Corning, New York, U.S.A., of 3/16 inch outside diameter with a round bore of 1/8 inch diameter, was treated with an aqueous 10% hydrofluoric acid solution to etch away the thin surface layer of the glass which had, in storage, absorbed a certain amount of water.

(2) One end of tube was subjected to a heat of approximately 975° centigrade and preliminarily drawn out to close an open end of the bore.

(3) A round piece of metal composed of a six parts lead-five parts tin-five parts bismuth alloy, approximately 1 inch in length and of a slightly smaller diameter than the bore of the tube, was inserted in the bore to the limit established by the closed end.

(4) The tube was advanced continuously and downwardly at an angle of approximately 60° to the horizontal and with the contained metal foremost, at a rate of approximtely 1/100 inch per second, into the maximum heat zone of an open concentrated flame of 1000° C. which heated the glass to a temperature of approximately 850° centigrade, while at the same time the glass was undergoing a gentle longitudinal vibration of 60 cycles per second. The flame was fueled by a conventional illuminating gas and air mixture and maintained without appreciable flickering.

(5) The glass was softened to a drawable or ductile state, at a viscosity of approximately $10^6$ poises and the contained metal to a molten state at the heat zone by the aforesaid heat and the tube was drawn out, at a rate of approximately 1 inch per second, to provide a metal-cored filament having an elongation of approximately 100 to 1 and a cross-sectional reduction of glass and metal components to approximately 1/10 of the dimensions given at step 1.

(6) The heat, point, of heat-application, ratio of glass tube supply to takeup, and overall speed of advancement were adjusted to provide a constant cross-section throughout an elongation of considerable extent.

(7) The elongated filament was cut into sections 10 inches long. One-hundred sections were produced.

(8) The sections were inspected under magnifying means and any seriously imperfect sections were discarded.

(9) Eight of these filament sections were assembled in parallel contiguous relation on a flat rectangular glass plate, 10 inches long, composed of the aforesaid "No. 0120" glass, the plate being of a width to exactly accommodate all of the filaments and of 1/8 inch thickness, the filaments being held in position on the glass plate by a thin coating of a clear beeswax.

(10) The assembly of filaments and plate was then advanced, without vibration, horizontally at a rate of approximately 1/200 inch per second into the heat zone of a flame which was less concentrated than the flame of step (4), thus bringing the glass to a temperature of about 800° centigrade.

(11) The assembly was drawn from the flame, at a downward angle of 5° and at a rate of approximately 1/4 inch per second, to provide an elongation of twenty-five to one and a reduction in width and thickness of five to one.

(12) The elongated assembly in the form of a strip was cut into sections and both ends of each section were heat-sealed.

(13) Five of these sections were arranged and held on a new glass plate to form an assembly 10 inches long, the plate being slightly less in width than the overall width of the assembled sections to provide a slight overhang of the long sides of the two outside sections relative to the plate, width here being taken as in a direction transversely of the long dimension of the metal filaments.

(14) The entire assembly was placed in an oven heated by gas, brought to a temperature of 500° centigrade and compressed at a pressure of about 3 lbs. per sq. inch, both in a direction normal to its major surfaces and in a direction at 90° relative thereto, pressure being exerted against the aforesaid overhang of the strips. The temperature was raised to 550° centigrade and held for 20 minutes to weld the strips together and to the base. Then the temperature was slowly reduced to an annealing temperature of approximately 435° centigrade and eventually reduced to room temperature. Thereafter the assembly was removed as a compact integral unit, free of gaps, depressions or other irregularities in its surfaces.

(15) The steps of elongating, cutting, sealing, reassembling, compressing, welding and annealing were repeated, as described in steps 9 through 13, including three additional elongations of 25 to 1, reducing the maximum temperature of the glass by 50° centigrade for each elongation. The completed plate-like element was found to linearly polarize light in the visible range.

EXAMPLE II (1) A flat glass strip, composed of a potash-soda-lead glass "No. 0120" manufactured by Corning Glass Works, Corning, New York, U.S.A., 10 inches long, 1/4 inch wide, 3/16 inch thick and having two centered 1/16 inch bores extending, longitudinally, from end-to-end, was heat-sealed at one end of the bores in an open flame at about 975° centigrade; held at an inclined position of approximately 60° to the horizontal; a lead-tin-alloy, containing equal proportions of each metal, was introduced in a solid state into the open ends of the bores; and the strip and contained metal, still at the inclined position, were heated to about 250° centigrade by a flame of the type shown in FIGURE 1 so that the alloy became molten and gaseous bubbles escaped from the glass and metal and through the open ends of the bores. The strip was cooled and, in its solidified state, contained two continuous longitudinal metal cores.

(2) The metal-cored glass strip was advanced horizontally at a rate of approximately 1/100 inch per second into a rather broad heat zone of an open flame, of approximately 850° centigrade.

(3) The glass was softened at the heat zone to a drawable viscous state, at a viscosity of approximately $10^6$ poises, and the contained metal to a molten state while the strip was drawn out at a rate of approximately 1/200 inch per second to provide an elongation of approximately 25 to 1 and a cross-sectional reduction of approximately 5 to 1.

(4) The elongated solidified strip was cut into sections ten inches in length and both ends of each section were heat-sealed.

(5) Two of these sections were positioned on a glass plate ten inches long, of similar composition to, and of a slightly narrower width than the combined width of the sections and of a 1/8 inch thickness.

(6) The assembly was positioned horizontally in a gas oven, brought to a temperature of about 500° centigrade and compressed vertically and horizontally, at approximately 3 lbs. per sq. inch. The temperature was raised to 550° and held for about 20 minutes to weld the two sections to one another and to the glass plate. The temperature was reduced to an annealing temperature of approximately 435° centigrade, and then further reduced slowly to room temperature to complete annealing.

(7) The steps of elongating, cutting sealing, reassembling cut sections on a new glass base plate, compressing, welding and annealing were repeated seven times, reducing the heat of the flame by approximately 50° centigrade at each elongation step. The completed element polarized light in the visible range.

Wherein, as previously described, the apparatus involves the introduction of solid metal pieces or slugs to a glass enclosing medium, the slugs then being heated to a molten condition within the softened glass, it will be understood that the feeding of the metal thereinto may be provided automatically, as by the addition of a magazine holding a supply of the metal and by release or propulsive means connected, for example, with the rotating shaft 38 or by photoelectric cell means wherein an actuating beam is allowed to pass and effect the release of a second slug of the metal when a first slug is advanced. Assuming the apparatus of both FIGS. 1 and 4 to be employed in producing a polarizer, it is also conceivable that the elongated filament produced by the mechanism of FIGURE 1 could be advanced to cutting means by an endless belt of the type of FIG. 4 instead of being taken up on the drum 70, could be sectioned and guided to positioning means for assembly on a supporting plate, and then treated with a temporary adhesive and introduced to the apparatus of FIG. 4, all of these functions being performed automatically. Similarly, it is within the realm of possibility to incorporate sectioning, assembling, compacting and reintroductory means with apparatus of the type of FIG. 4 to reduce or eliminate certain steps which have been described as performed manually. A vibratory means, alternative to the element 48, could be mounted, in terms of advancement of the glass tube 15, just prior to the heating zone to provide transverse or crosswise vibrations which have also been found to be effective in dissipating bubbles through the molten metal.

A driven endless belt or other type of feed mechanism could reasonably supplant the rack and pinion shown in FIGS. 1 and 4 for supplying the materials to be elongated. Another alternative having certain advantages is to provide a fixed mounting of the burners 56 and 156 and, in both instances, to restrict movement to the baffle or shield 64, alone, when it is required to vary the location of the heating zone.

The temperatures given herein for the elongation step and oven treatments may, of course, be varied considerably depending upon various speeds of advancement during elongation, variations in time of oven treatment, and the use of glasses and metals having other softening and melting characteristics. The annealing step may occur for each oven treatment or may be restricted to the oven treatment of the final product if adequate to eliminate strain patterns. Quartz could be employed instead of glass where, for example, transmission in the ultraviolet is an essential, higher temperatures being required for its softening. The draw ratios stated herein are also to be considered as subject to considerable variance. Elongations of as little as 3 to 1 and in excess of 200 to 1 have been performed successfully.

The apparatus of either FIGURE 1 or FIG. 4 is, in general, adapted to perform multiple elongations of a single filament, assuming that the filament shall be combined with a new supporting glass element of suitable composition after completion of one elongation and preceding the next elongation. Such a supporting element could, appropriately, be a glass tube, the elongated filament being inserted in the bore thereof and both the filament and glass tube then being drawn out together. In an instance where, for some reason, it might be desirable to remove the glass enclosing medium from the metallic core as, for example, in the case of a single filament, the glass may be etched away by an acid to which the metal is inert, e.g., subjection of a glass filament having a platinum core to hydrofluoric acid.

As previously suggested, a considerable choice of metals is possible in forming the filaments. The general requirements call for metals which, in large area, are highly reflective and appear silvery; which expand on heating to a given temperature similarly to the enclosing glass; which are substantially inert, chemically, relative to the glass; which, when molten, wet the glass; which have a melting point below the working softening point of the glass and a boiling point far above the softening point of the glass. In addition to the metals previously mentioned, others known to be suitable to the purpose but not necessarily all-inclusive comprise antimony, indium and gallium with many others indicated as appropriate. Other known employable alloys include either platinum or palladium with any one or given combinations of lead, tin, bismuth, antimony or silver.

What is claimed is:

1. An apparatus for drawing a continuous length of fine glass filament having a substantially constant cross-section throughout its length, said apparatus including a drive motor with a manually adjustable continuously variable speed control, feed means for advancing a glass element having a bore containing a metal of lower melting temperature than the softening temperature of said glass, manually adjustable variable speed means connecting said drive motor and said glass feed means for independently adjusting the feed rate of said glass element, heating means, with temperature control means at least sufficient to soften said glass element and longitudinally positionable along said glass element, takeup means adapted for drawing a filament from a heat softened zone on said glass element, and having:

feedback means to regulate said glass filament cross-section which is responsive to drawing tension, including intermediate driving means movably connecting said drive motor to said takeup means said intermediate drive means and said takeup means cooperating to draw out said filament from said heat softened zone.

2. An apparatus as described in claim 1 wherein said feedback means to regulate said glass filament cross-section uses differential movements between said intermediate drive means and said takeup means for varying the position of said heating means longitudinally along said glass element during said glass element's elongation so as to apply heat to a larger or smaller cross-section of said glass element as required to keep the average viscosity of said heat softened glass zone and said filament cross-section approximately constant.

3. An apparatus as defined in claim 2 wherein said feedback means to regulate said glass filament cross-section includes a first bell crank coupled to said drive motor and connected to said takeup means through spring means under a predetermined tension, a second bell crank rotatably mounted in one arm of said first bell crank, a link connecting one arm of said second bell crank with said takeup means, a second link connecting the other arm of said bell crank with one arm of a third bell crank and a link connecting the other arm of said third bell crank with said heating means whereby relative movement between said takeup means and said first bell crank cause longitudinal movement of said heating means along said glass element in response to tension changes.

References Cited

UNITED STATES PATENTS

| 3,037,241 | 6/1962 | Bazinet et al. | 65—13 XR |
|---|---|---|---|
| 3,088,297 | 5/1963 | Kapany et al. | 65—13 XR |
| 3,328,143 | 1/1962 | Hick | 65—13 XR |
| 3,033,071 | 5/1962 | Hick. | |

FOREIGN PATENTS 31,285 10/1925 France.

FRANK W. MIGAR, Primary Examiner

U.S. Cl. X.R.

65—13, 29, 35, 57, 59, 60, 108, 145, 154, 158, 162, 268, 271, 283, 292